(12) United States Patent
Owen

(10) Patent No.: US 9,350,779 B2
(45) Date of Patent: *May 24, 2016

(54) PROVIDING CONTROL INFORMATION TO A MULTIMEDIA SERVER

(71) Applicant: WOWZA MEDIA SYSTEMS, LLC, Golden, CO (US)

(72) Inventor: Barry Owen, Littleton, CO (US)

(73) Assignee: WOWZA MEDIA SYSTEMS, LLC, Golden, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/623,403

(22) Filed: Feb. 16, 2015

(65) Prior Publication Data

US 2015/0195321 A1    Jul. 9, 2015

Related U.S. Application Data

(63) Continuation of application No. 14/151,108, filed on Jan. 9, 2014, now Pat. No. 8,990,408.

(51) Int. Cl.

| | |
|---|---|
| *G06F 15/16* | (2006.01) |
| *H04L 29/06* | (2006.01) |
| *H04L 29/08* | (2006.01) |
| *H04N 21/472* | (2011.01) |
| *H04N 21/6587* | (2011.01) |
| *H04W 4/18* | (2009.01) |

(52) U.S. Cl.
CPC ............ *H04L 65/60* (2013.01); *H04L 65/1059* (2013.01); *H04L 65/607* (2013.01); *H04L 65/608* (2013.01); *H04L 67/303* (2013.01); *H04N 21/47217* (2013.01); *H04N 21/6587* (2013.01); *H04W 4/18* (2013.01)

(58) Field of Classification Search
CPC ..... H04L 65/60; H04L 65/607; H04L 65/608; H04L 67/303; H04N 21/6587
USPC ............ 709/219, 228, 230, 227, 231; 725/32, 725/86
See application file for complete search history.

(56) References Cited

U.S. PATENT DOCUMENTS

| | | | |
|---|---|---|---|
| 6,919,078 B2 | 7/2005 | Ni et al. | |
| 7,096,322 B1* | 8/2006 | Sollom | G06F 9/30047 711/143 |
| 8,230,101 B2 | 7/2012 | Sekiguchi et al. | |

(Continued)

OTHER PUBLICATIONS

"How can I record and save my Jive broadcast?"; retrieved Jan. 6, 2014 from https://ustream.zendesk.com/1 entries/21127033-How-can-1-record-and-save-my-live-broadcast-; 2012 Ustream, Inc., 3 pages.

(Continued)

*Primary Examiner* — Frantz Jean
(74) *Attorney, Agent, or Firm* — Toler Law Group, PC

(57) ABSTRACT

A method may include receiving, at a mobile computing device comprising a processor, input identifying control information to be sent from the mobile computing device to a media server. The method may include determining, at the mobile computing device, whether the computing device is sending a media stream to the media server. In response to determining that the mobile computing device is sending a media stream to the media server, the control information may be sent from the mobile computing device to the media server without interrupting the media stream by embedding the control information in the media stream.

20 Claims, 6 Drawing Sheets

(56) References Cited

U.S. PATENT DOCUMENTS

| | | | |
|---|---|---|---|
| 8,296,810 | B1 | 10/2012 | Everson et al. |
| 8,427,981 | B2 | 4/2013 | Wyss et al. |
| 2008/0216139 | A1 | 9/2008 | Liwerant et al. |
| 2009/0259756 | A1 | 10/2009 | Karlsson et al. |
| 2011/0280143 | A1 | 11/2011 | Li et al. |
| 2011/0280153 | A1 | 11/2011 | Li et al. |
| 2012/0258776 | A1 | 10/2012 | Lord et al. |
| 2013/0007788 | A1* | 1/2013 | Levinson et al. ............... 725/13 |
| 2013/0014258 | A1* | 1/2013 | Williams ........................ 726/24 |

OTHER PUBLICATIONS

How to record live streams (HTTPLiveStreamRecord); retrieved on Jan. 6, 2014 from http://www.wowza.com/forums/content.php?123-How-to-record-live-streams-(HTTPLiveStreamRecord); published on Oct. 2, 2010, 14 pages.

"How to set up live streaming using an RTMP-based encoder"; retrieved on Jan. 6, 2014 from http://www.wowza.com/forums/content.php?36; published Oct. 1, 2010, 8 pages.

"How to use Wowza GoCoder video broadcasting iOS app with Wowza Media Server"; retrieved Jan. 6, 2014 from http://www.wowza.com/forums/content.php?500; published Apr. 30, 2013, 12 pages.

Huitema, C.; Real Time Control Protocol (RTCP) Attribute in Session Description Protocol (SDP); Network Working Group; Request for Comments: 3605; Standards Track; The Internet Society; Oct. 2003, 8 pages.

* cited by examiner

PROVIDING CONTROL INFORMATION TO A MULTIMEDIA SERVER

CROSS-REFERENCE TO RELATED APPLICATIONS

The present application is a continuation of and claims priority to U.S. patent application Ser. No. 14/151,108, filed on Jan. 9, 2014 and entitled "Providing Control Information to a multimedia server," now U.S. Pat. No. 8,990,408, the content of which is incorporated by reference in its entirety.

BACKGROUND

The popularity of the Internet, coupled with the ever-increasing capabilities of personal/mobile electronic devices, has provided users with the ability to enjoy, as well as to generate for others to enjoy, multimedia content almost anytime and anywhere. For example, users may receive streams corresponding to live and video on demand (VOD) content (e.g., television shows and movies) at personal electronic devices, such as computers, mobile phones, and tablet computers. Further, users may use a personal electronic device to capture and stream live events (e.g., sports events) to other users.

Generally, when a stream is provided to a server, the server should have instructions on how to process the stream. There are instances, however, when a user, through an oversight for example, may not have provided any, all, or proper instructions to a server before the server begins to receive the stream. In such instances, the user may have to stop a streaming application that is sending a stream to the server, access the server, and manually configure the server to process the stream. After manually configuring the server, the user may restart or resume the streaming application.

SUMMARY

The present disclosure is directed to techniques of providing instructions or control information to a server regarding how the server is to process a stream (e.g., an event that is being streamed to the server). The control information may be provided to the server before or during the streaming of the event. Before the streaming of the event, the control information may be provided to the server in a file or during connection establishment between the server and a user device.

During the streaming of an event, control information may be provided to the server by use of a variety of methods. For example, the control information may be embedded into the stream being sent to the server, without interrupting communication of the ongoing stream. The server may detect, parse, and act on the embedded control information without interrupting output of the stream to viewer devices. Another method of providing control information after streaming has begun includes establishing a new connection with the server, in addition to the (original) connection over which the stream is being provided to the server. The control information may be provided over the new connection while the stream continues to be provided to the server over the original connection.

When the server receives control information from a device, the server will begin to process selected or all streams from the device in accordance with the control information. Thus, when newly-sent control information is received by a server during communication of a stream, the server begins to process the stream in accordance with the newly-sent control information. The newly-sent control information may include new video processing parameters (e.g., transcoding parameters, transrating parameters, etc.), digital video recorder (DVR) parameters, or other types of control information.

BRIEF DESCRIPTION OF THE DRAWINGS

FIG. 3(*b*) illustrates another particular embodiment of a GUI generated by the computing device of FIGS. 1-2;

FIG. 3(*c*) illustrates another particular embodiment of a GUI generated by the computing device of FIGS. 1-2;

DETAILED DESCRIPTION

Figure 1:
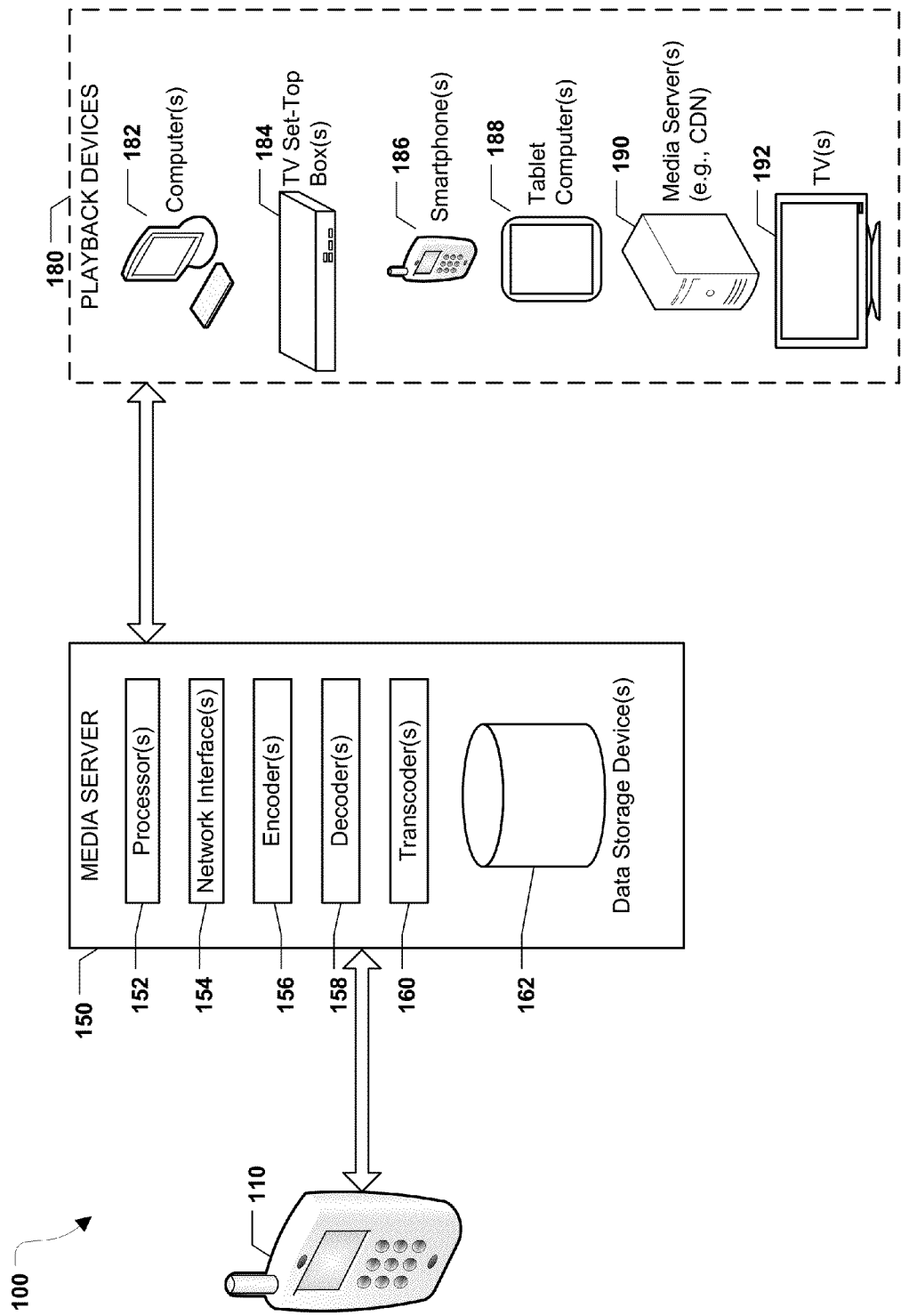
FIG. 1 illustrates a particular embodiment of a system in which multimedia content may be streamed from a computing device to a media server.

FIG. 1 illustrates a particular embodiment of a system 100 in which multimedia content may be streamed from a personal electronic device 110 to a media server 150 and vice versa. The media server 150 may process a media stream received from the personal electronic device 110 and may output the processed media stream (or versions thereof) to one or more computing devices 180.

Figure 2:
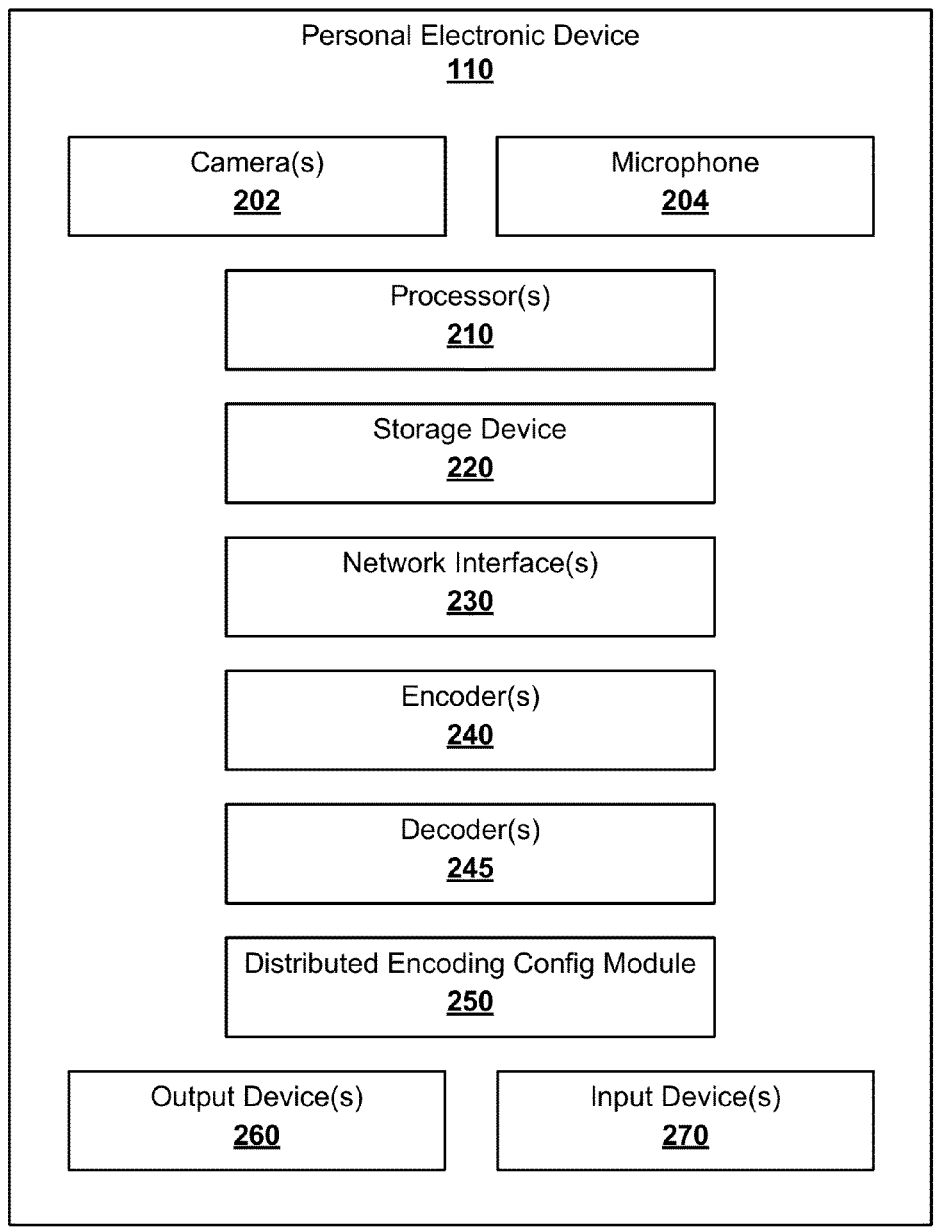
FIG. 2 illustrates a block diagram of a particular embodiment of the computing device of FIG. 1.

The personal electronic device 110 may be a computing device, such as a laptop computer, a mobile phone, a smartphone, a tablet computer, etc. FIG. 2 depicts an exemplary block diagram of the personal electronic device 110. The personal electronic device 110 includes one or more processors 210 and one or more network interfaces 230. The one or more network interfaces 230 may include input interface(s) and output interface(s) that are configured to receive data and to send data, respectively. In a particular embodiment, the one or more network interfaces 230 may be wired and/or wireless interfaces that enable the personal electronic device 110 to transfer and receive data via a network, such as a local area network (LAN) or the Internet. For example, the one or more network interfaces 230 may include an Ethernet interface, a wireless interface compatible with an Institute of Electrical and Electronics Engineers (IEEE) 802.11 (e.g., Wi-Fi) protocol, and/or a wireless interface capable of transferring data over a third-generation (3G) connection or a fourth generation (4G) connection (e.g., a Worldwide Interoperability for Microwave Access (WiMax) connection or a Long Term Evolution (LTE) connection).

The personal electronic device 110 may also include one or more cameras 202 or other video capture devices, and a microphone 204 or other audio capture device, to capture live video and/or audio events. The personal electronic device 110 may contain a storage device 220 for storing captured events as well as software programs and/or data used by the personal electronic device 110. In a particular embodiment, the storage device 220 may include one or more random access memory (RAM) devices, read-only memory (ROM) devices, hard-drives, solid state drives, and/or other devices that may be used to store data.

The personal electronic device 110 may further include one or more encoders 240, decoders 245 and a distributed encoding configuration module 250, each of which may be implemented using hardware and/or software (e.g., instructions executable by the one or more processors 210). The one or more encoders 240 may be used to encode data that is to be transferred to the media server 150, and the one or more decoders 245 may be used to decode encoded data received from the media server 150. The encoded data may represent a media stream (or a portion thereof) and may include audio and/or video data. In a particular embodiment, a video portion of the stream may be encoded by the one or more encoders 240 using an Advanced Video Coding (AVC) codec/decoder (codec), also known as H.264, and the audio portion of the stream may be encoded using an Advanced Audio Coding (AAC) codec. H.264 is a standard for video compression used for recording, compressing, and distributing high definition video. AAC is a standardized compression and encoding format for digital audio. In alternate embodiments, different video and audio codecs may be used.

The distributed encoding configuration module 250 may be part of a software application provided by a vendor of the media server 150 and/or may be downloaded by a user of the personal electronic device 110. The distributed encoding configuration module 250 may generate a graphical user interface (GUI) and may send the GUI to an output device 260 (e.g., a display device) of the personal electronic device 110. A user may interact with the GUI via one or more input devices 270 (e.g., a keyboard, a mouse, a touchscreen, etc.).

FIG. 3(a) depicts an exemplary GUI 300 that may be generated by the distributed encoding configuration module 250. For example, the distributed encoding configuration module 250 may be part of a software application that is executable at the personal electronic device 110 to encode and transmit a media stream to the server 150. The GUI 300 may be generated and displayed before streaming begins and/or during streaming (e.g., the GUI 300 may overlay all or part of a "viewfinder" screen in a streaming application executed by the personal electronic device 110).

The GUI 300 includes camera buttons 310. The camera buttons 310 provide a quick method of determining a status of different components of the one or more cameras 202 as well as a simplified method of changing the status of the components. For example, the personal electronic device 110 may include a front facing camera and a rear facing camera, either of which may be used to capture a live event. Alternatively, or in addition, the personal electronic device 110 may include a flash (e.g., light source) to assist video capture of a live event. The camera buttons 310 may include a button 314 in which the status of the flash is indicated. When the button 314 is selected (e.g., pressed or touched), the status of the flash may be changed from one state to another. For example, if the status of the flash is "off", as shown in the GUI 300, selecting the button 314 changes the status of the flash to "on". Conversely, if the status of the flash is "on", selecting the button 314 changes the status of the flash from "on" to "off".

A button 312 enables a user to toggle between the front facing camera and the rear facing camera to capture video. Specifically, if the rear facing camera is active, as shown in the GUI 300, selecting the button 312 deactivates the rear facing camera and activates the front facing camera to capture video. If, on the other hand, the front facing camera is active, selecting the button 312 deactivates the front facing camera and activates the rear facing camera to capture video.

The GUI 300 also includes a bitrate button 320. Within the bitrate button 320 may be displayed a particular bitrate that is to be used to encode a media stream. Selecting the bitrate button 320 may enable a user to choose a bitrate from a plurality of available bitrates (e.g., from a menu). The newly-chosen bitrate is then displayed within the bitrate button 320.

The GUI 300 further includes a server button 330. When the server button 330 is selected, a drop-down menu or server GUI may be displayed. FIG. 3(b) illustrates a representative server GUI 340. The server GUI 340 includes a done button 342, a host option 344, an application option 346 and a login option 348. When the host option 344 is selected, a user is given an opportunity to choose a media server 150 with which the personal electronic device 110 is to communicate. The media server 150 may be chosen by name and/or internet protocol (IP) address. Hence, upon selecting the host option 344, a list of IP addresses and/or server names may be displayed, and the user may select from the list of displayed servers or may manually enter a particular name or IP address for the server. In addition, the user may be presented with a list of port numbers to choose from. The chosen port number is used for communication between the personal electronic device 110 and the media server 150. For example, the port may be a transmission control protocol (TCP) port or a user datagram protocol (UDP) port of the media server 150 and/or the personal electronic device 110. If the user does not choose a port number, then a default port may be used. For example, TCP port 1935 may be used as a default port when TCP is used to communicate with the media server 150.

After selecting the application option 346, the user may enter an "application name" for the media stream. The application name may represent data used by a server to configure a particular stream or set of streams. The configuration information sent from a capture/encoding device to a server may configure a single application. For example, when a capture/encoding device is streaming to an application named "live," the sent configuration information may only apply to the "live" application hosted by the server, and not to any of the other applications hosted by the server. In a particular embodiment, the application name is included in a portion of a uniform resource locator (URL) that can be used to view the media stream (or a version thereof). Selecting the login option 348 provides an opportunity to enter a user name and password for server authentication purposes. Information entered via the server GUI 340 may be used to establish a connection to the media server 150.

In a particular embodiment, a cloud-based server instance may be initialized if a user does not have a preconfigured server available to receive and process the media stream. For example, the server GUI 340 may include an additional option that causes the personal electronic device 110 to request a cloud-based media server to be initialized. Alternatively, or in addition, a cloud-based server may be initialized (e.g., automatically or in response to confirming user input) when the IP address, port, user name, and/or password are not provided or are erroneous. A cloud-based media server may also be used as a backup media server if the personal electronic device 110 encounters a problem establishing a connection to the server 150.

To illustrate, the user may select a "Stream to cloud" option 349. The user may be prompted to log in to or register for a cloud-based media server product or service from within the streaming application (or from a web browser launched by the streaming application). For example, the user may have an account that includes billing information for use of the cloud-based media server. Alternatively, login may not be required (e.g., for a free cloud-based media server). The streaming application executing on the personal electronic device 110 may communicate with a network device (e.g., a web server) to provision or initiate a cloud-based media server. The personal electronic device 110 may receive a playback URL from the network device. For example, the playback URL may be received within the streaming application or via a side channel message, such as an e-mail, a short message service (SMS) message, etc. A user may distribute the playback URL to enable other users to view the media stream (or a version thereof) from the cloud-based media server.

Figure 3:
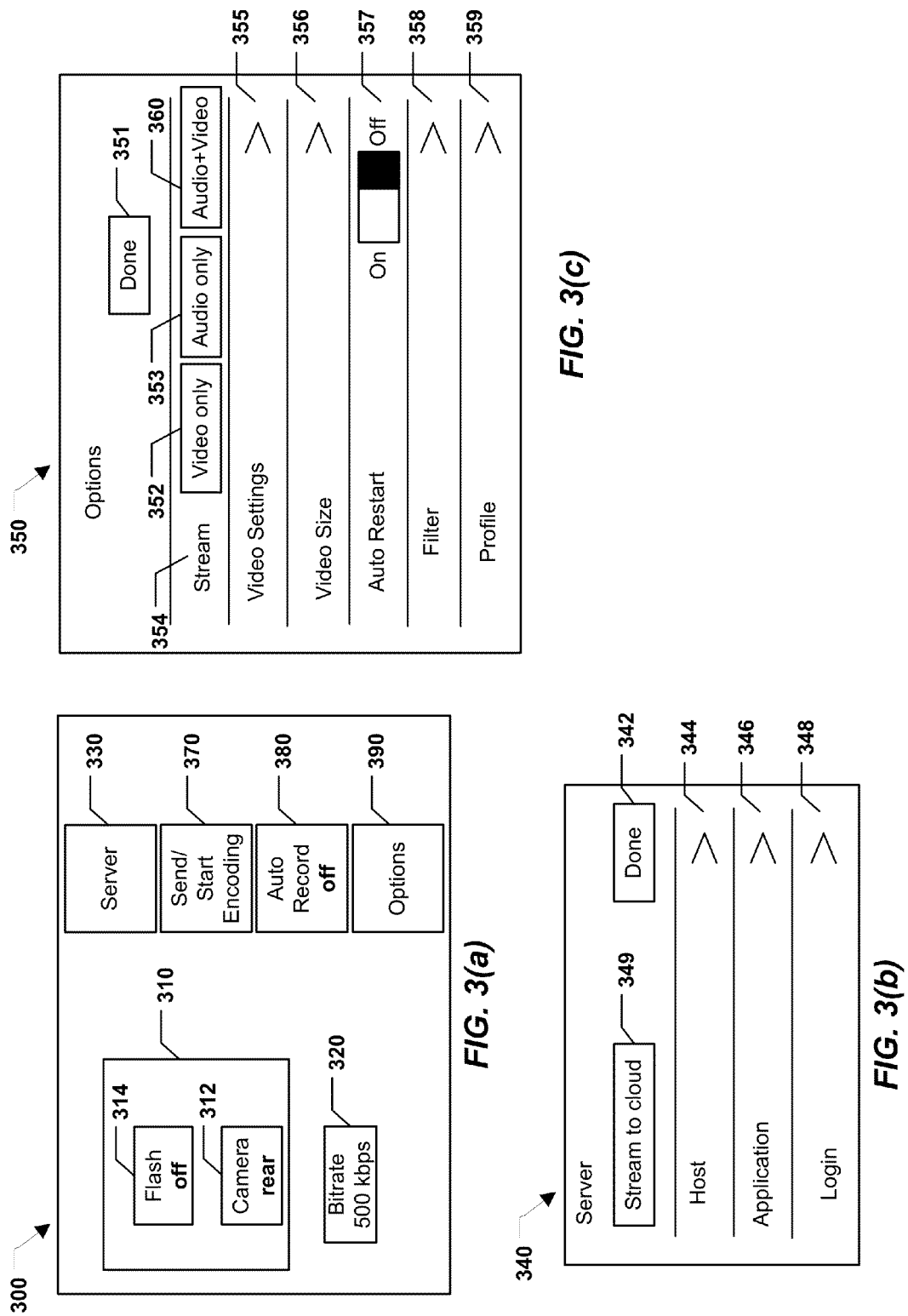
FIG. 3(*a*) illustrates a particular embodiment of a graphical user interface (GUI) generated by the computing device of FIGS. 1-2.

After server information has been entered or a cloud-based server has been configured, the user may select the done button 342 to return to the GUI 300 of FIG. 3(*a*). The GUI 300 includes an options button 390. When the options button 390 is selected, a drop-down menu or options GUI may be displayed. FIG. 3(*c*) illustrates a representative options GUI 350. The options GUI 350 includes a done button 351, a stream option 354 that includes a video only button 352, an audio only button 353, an audio+video button 360, a video settings option 355, a video size option 356, an auto restart button 357 having an "on" position and an "off" position, a filter option 358, and a profile option 359.

To indicate that the stream to be transferred to a server (e.g., the server 150) is a video stream having both a video and an audio portion, a user may select the audio+video button 360. If the user wants to transfer only video data or only audio data to the server, the user may select the video only button 352 or the audio only button 353, respectively. After selecting the video settings option 355, the user may choose a frame rate (e.g., a number of frames per second (fps)) and a key frame interval used to encode the media stream to be sent to the server. The user may also choose a transport protocol (e.g., TCP, UDP, etc.) to be used to send the media stream to server.

After selecting the video size option 356, the user may choose a video size (e.g., resolution) for the stream. Video sizes may include 480×360, 640×360, 640×480, 720p (a high definition format), or another size. When the auto restart button 357 is set to "on", the personal electronic device 110 automatically resumes streaming to the server after re-establishment of a lost connection between the personal electronic device 110 and the server. When the auto restart button 357 is set to "off", the personal electronic device 110 does not automatically resume streaming until specifically instructed to do so by the user. The filter option 358 enables the user to indicate whether a filter is to be used when capturing a live event and if so, which filter to use. The filters that may be used include, but are not limited to, black and white (B/W), blur, and B/W blur.

After selecting the profile option 359, the user may indicate whether a profile is to be used to provide control information to the media server 150 and if so, which profile to use. A profile, as explained further herein, may correspond to a set of control parameters in a file stored on the media server 150. Alternatively, a profile (or a portion thereof) may be provided to the media server 150 during streaming. In a particular embodiment, a profile includes transcoding parameters, transrating parameters, and/or adaptive bitrate (ABR) streaming parameters, as further described herein.

The user may select the done button 351 to return to the GUI 300 of FIG. 3(*a*). In addition, the GUI 300 includes a send/start encoding button 370 and an auto record button 380. The send/start encoding button 370, when selected, instructs the personal electronic device 110 to establish a connection with the media server 150, begin capturing audio and/or video data, and start transmitting a media stream and/or send control information to the media server 150. In a particular embodiment, when a stream is being sent to the media server 150, unless the media server 150 is specifically instructed to store the stream on a persistent basis (e.g., to record the stream) for video on demand (VOD) or video playback, the media server 150 does not store a copy of the media stream. The auto record button 380 may enable the user to instruct the media server 150 to record the stream. Moreover, the auto record button 380 may be selected after streaming has begun, thereby enabling the user to instruct the media server 150 to record the media stream without having to interrupt the streaming process and login to the media server 150 using a browser. In a particular embodiment, the user may also enter a name (e.g., file name) for the recorded version of the stream stored at the media server and/or security settings associated with the recorded version of the stream (e.g., encryption settings, an access password, etc.)

Thus, the GUIs 300, 340 and 350 include options to define various local parameters (e.g., audio-only, video size, key frame interval, etc.) and remote parameters (e.g., auto record, profiles, etc.) that are to be used to encode, process, and deliver a stream. For example, when ABR streaming is supported by the media server 150, the GUI 300, for example, may include options to define the ABR renditions of a stream to be generated by the media server 150. Adaptive streaming enables a computing device to request different versions or renditions of a stream in response to changes in network conditions. Changes in network conditions may occur due to various reasons. For example, a viewer may view a media stream provided by the media server 150 using a computing device, such as a smartphone. The smartphone may experience different connection speeds due to the user moving from one physical location to another, changing from a 3G network to a 4G network (or vice versa), network congestion, etc. When connection speed decreases, the consumer's smartphone may request a lower quality rendition of the media stream (e.g., lower video bitrate, audio bitrate, resolution, frame rate, etc.) to compensate for the connection speed degradation, so that "smooth" playback of the media stream may be maintained. Conversely, when connection speed increases, the consumer's smartphone may request a higher quality rendition of the media stream (e.g., higher video bitrate, audio bitrate, resolution, frame rate, etc.) from the media server 150. To support adaptive streaming, the media server 150 may divide each rendition of the media stream into multiple "chunks" that are key frame aligned. Each rendition may have a different combination of video bitrate, audio bitrate, resolution, frame rate, protocol, etc. In a particular embodiment, the various parameters for each adaptive streaming rendition to be generated by the media server 150 are stored in a profile. Thus, by selecting a particular profile via the profile option 359, the user may instruct the media server 150 as to which combination of ABR renditions are to be generated by the media server 150.

It should be noted that the various parameters and options described herein are for example only, and not to be considered limiting. To illustrate, many different parameters and options may be presented to the user via the GUIs 300, 340 and 350. The parameters and options may include, but are not limited to, frame sizes, bitrates, video coders/decoders (CODECs), audio CODECs, audio sampling rates, number of audio channels, parameters of adaptive streaming groups (e.g., input indicating that renditions A, B, and C are for mobile devices, renditions X, Y, and Z are for desktop/laptop computers, and renditions M and N are for set-top boxes (STBs)), etc. As further examples, a user may be provided options to specify digital rights management (DRM) settings, particular times that a stream is to be made available to a user, particular geographic locations that viewers are to be located in to view the stream, etc.

Returning to FIG. 1, the media server 150 may include one or more processors 152 and various components that are executable by the one or more processors 152. The media server 150 may correspond to or include software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the one or more processors 152), or any combination thereof. In a particular embodiment, one or more operations and/or components described with reference to the media server 150 may correspond to operations and/or components of a cloud-based media server (e.g., a media server available as software as a service (SaaS)).

The media server 150 may include one or more network interfaces 154. For example, the one or more network interfaces 154 may include input interface(s) and output interface(s) that are configured to receive data and to send data, respectively. In a particular embodiment, the one or more network interfaces 154 may be wired and/or wireless interfaces that enable the media server 150 to transfer and receive data via a network, such as the Internet. For example, the one or more network interfaces 154 may include an Ethernet interface, a wireless interface compatible with an IEEE 802.11 (e.g., Wi-Fi) protocol, or other wired or wireless interfaces.

The media server 150 may also include encoder(s) 156 and decoder(s) 158, each of which may be implemented using hardware and/or software (e.g., instructions executable by the one or more processors 152). The decoder(s) 158 may decode a stream (e.g., an event being streamed) from the personal electronic device 110 to generate a decoded stream. The encoder(s) 156 may re-encode the decoded stream (e.g., in accordance with instructions received from a user of the personal electronic device 110) to generate one or more second encoded streams. In a particular embodiment, the one or more second encoded streams are ABR renditions that may have larger or smaller bitrates, frame sizes, etc. as compared to the original stream from the personal electronic device 110. The media server 150 may stream the ABR renditions to destination devices, such as one or more of computing devices 180.

The transcoder(s) 160 may enable the media server 150 to provide adaptive bitrate streaming in real-time (e.g., on-the-fly) or near-real-time. Data storage device(s) 162 may be used to store streamed events (e.g., in response to selection of the auto record button 380 of FIG. 3(a)). The data storage device(s) 162 may also buffer chunks of an ABR rendition and store software programs and/or data used by the media server 150 (e.g., a file, such as an extensible markup language (XML) file that includes a profile selected via the profile option 359 of FIG. 3(c)). The data storage device(s) 162 may include one or more random access memory (RAM) devices, read-only memory (ROM) devices, hard-drive(s), solid state drive(s), etc.

The computing devices 180 may include devices that are configured to receive media stream(s) from the media server 150. For example, the computing devices 180 may include one or more computer systems 182, such as desktops, laptops, etc. The computing devices 180 may also include one or more televisions (TVs) 192, TV set-top-boxes 184, smartphones 186, and tablet computers 188. In a particular embodiment, the media server 150 is configured to send media streams to other media server(s) 190, such as edge servers of a content delivery network (CDN).

During operation at the system 100, a user of the personal electronic device 110 may activate a streaming application. The streaming application (e.g., including the distributed encoding configuration module 250) may display configuration GUI(s), such as the GUIs 300, 340 and 350. Upon receiving configuration input via the configuration GUI(s), the distributed encoding configuration module 250 may determine whether the configuration information is directed to a "local" device (e.g., the personal electronic device 110) or directed to a "remote" system (e.g., the media server 150). Local device control information may be provided to appropriate modules of the personal electronic device 110. For example, when the user enters server connection parameters (e.g., IP address, port number, etc.), the distributed encoding configuration module 250 may provide the server connection parameters to a network interface of the personal electronic device 110 for use in establishing a connection to the media server 150. As another example, local encoding parameters entered by the user may be provided to the encoder(s) 240. As another example, when the user enters video settings information for the one or more cameras 202, such information may be provided to the one or more cameras 202 (or a controller thereof).

When the user provides control information for the media server 150, the personal electronic device 110 may provide the control information to the media server 150 in a plurality of different methods, depending on whether a media stream is already being streamed to the media server 150. When a media stream is not already being provided, the distributed encoding configuration module 250 may transfer control information to the media server 150 as a part of connection establishment (e.g., hypertext transfer protocol (HTTP) connection establishment) between the personal electronic device 110 and the media server 150.

To establish a connection with the media server 150, the distributed encoding configuration module 250 may use the server name or IP address provided via the host option 344 of FIG. 3(a). The distributed encoding configuration module 250 may also use the user name and password entered via the login option 348 of FIG. 3(b). Further, the distributed encoding configuration module 250 may use the application name provided by the user via the application option 346 of FIG. 3(b). The distributed encoding configuration module 250 may also provide user provided control information to the media server 150 during connection establishment. For example, if the user turns on recording via the auto record button 380, an HTTP request message sent to the media server 150 during connection establishment may indicate that the server 150 is to activate a digital video recorder (DVR) module. For example, the HTTP connection request may include an "autorecord=true" statement. The HTTP connection request may be generated and sent in response to selection of the send/start encoding button 370 of FIG. 3(a). An example of an HTTP request is further described with reference to FIG. 4.

If control information is to be provided to the media server 150 after streaming has begun, the distributed encoding configuration module 250 may transfer control information to the media server 150 by opening a separate (e.g., second) connection (e.g., a side channel or back channel) between the personal electronic device 110 and the media server 150. In a particular embodiment, the separate connection is an HTTP connection that is opened by using a representational state transfer (REST) request. REST is a stateless architecture that can be run over HTTP. Each REST request may include (e.g., transfer) information (e.g., state) that a server uses to complete the request. For example, completing a REST request may cause the server to access and process a file identified by the REST request, such as an XML file or a JavaScript® object notation (JSON) file (JavaScript is a registered trademark of Oracle Corp. of Redwood City, Calif.). An example of REST-based transfer of control information is further described with reference to FIG. 5.

Alternatively, once streaming has begun, control information may be provided to the media server 150 without opening a separate connection. For example, the control information (e.g., "autorecord=true") may be embedded into or intermixed with the stream data. To illustrate, the control information may be included in a packet that is sent from the personal electronic device 110 to the media server 150 as part of a sequence of packets. In a particular embodiment, the media server 150 parses the stream data received from the personal electronic device 110 for particular control indicators (e.g., flags that indicate the presence of control information in the stream data). For example, the equal-to character "=" may be interpreted as a control indicator, and statements that include "=" (e.g., autorecord=true, stream=audio-only, frame_rate=30, video_size=352×288, profile=profile7, etc.) may be interpreted as control information. When the media server 150 detects control information in the media stream, the media server 150 may process the control information and perform one or more operations based on the control information. For example, in response to detecting "autorecord=true", the media server 150 may start recording the stream to the data storage device(s) 162. As another example, in response to detecting "profile=profile7", the media server 150 may begin processing the media stream (e.g., generating ABR renditions) according to information specified in a profile named "profile7". To illustrate, "profile7" may be a key or a file name of an XML or JSON file.

It should be noted that the description of the equal-to character ("=") as a control indicator is for example only. In alternate embodiments, a different control indicator may be used. Moreover, in particular embodiments, instead of using a control indicator, control information may be provided in a particular location of packet(s) transmitted to the media server 150. For example, if a packet includes (or entirely consists of) control information, a specific bit or set of bits in a packet header may be set to a specific value to indicate that a data payload of the packet includes control information.

In a particular embodiment, a user may have multiple profiles stored on the media server 150. For example, the user may configure and store different profiles that are to be used in different scenarios. In certain instances, control information in a first profile may automatically cause the media server 150 to use (e.g., switch to) a second profile when a particular condition in the first profile becomes "true". Similarly, the second profile may automatically cause the media server 150 to use a third profile or to revert to using the first profile when a condition in the second profile is true. To illustrate, the first profile may identify a first set of ABR renditions that are to be used when the media stream received from the personal electronic device 110 is a high-definition (HD) stream, and the second profile may identify a second set of ABR renditions to be used for standard-definition (SD) streams. As an example, the first profile may include a condition that causes the media server 150 to switch to the second profile if the vertical resolution of the media stream drops to below 720 pixels, and the second profile may include a condition that causes the media server 150 to switch to the first profile if the vertical resolution of the media stream is greater than or equal to 720 pixels.

It will thus be appreciated that, as described with reference to FIGS. 1-3, a user may provide control information to a server prior to connection establishment without having to switch from a streaming application to a different application executed by the personal electronic device 110. Further, after streaming has begun, the user device may provide control information to the server without interrupting the stream and without having to terminate the streaming application or switch to a different application. The user may provide control information to the server without involving a server administrator. In addition, because control information may be provided to the server on a stream-by-stream basis, users may not need administrative privileges for the server as a whole. Reducing the number of users that have administrative privileges to the server may enhance server security.

Figure 4:
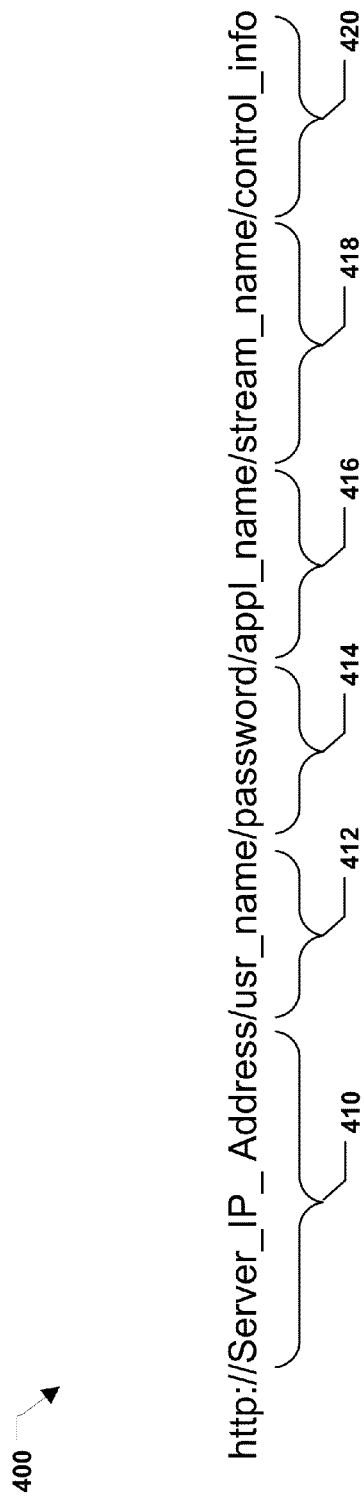
FIG. 4 illustrates a particular embodiment of a hypertext transfer protocol (HTTP) request.

FIG. 4 illustrates a particular embodiment of an HTTP request 400 that may be used to transfer control information to a media server. The HTTP request 400 includes a server name or IP address 410 identifying the media server 150 with which a connection is to be established. In a particular embodiment, a port number suffix is added to the IP address 410 (e.g., www.mymediaserver.com:1935). The HTTP request 400 also includes a user name (usr_name) 412 and a password 414 for the media server 150 to authenticate the user. In a particular embodiment, the user name 412 and the password 414 are encrypted. The HTTP request 400 further includes an application name (appl_name) 416 and a stream name (stream_name) 418.

The HTTP request 400 may include control information (control_info) 420. As described with reference to FIG. 1, the control information 420 may include one or more commands, such as a command to record a media stream. Multiple commands may be delimited by a delimiting character (e.g., "?", "/", etc.). In a particular embodiment, the control information 420 includes a command to implement access control for the media stream. When access control (e.g., digital rights management (DRM) control) is active, a media stream may not be accessed by a viewer unless the viewer (or the viewer's device) satisfied an access condition (e.g., provides a correct authentication code).

Figure 5:
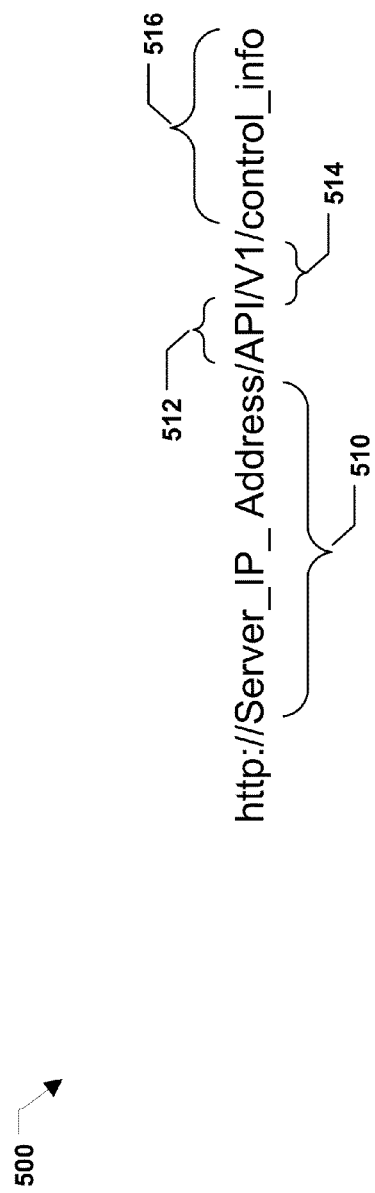
FIG. 5 illustrates a particular embodiment of a representational state transfer (REST) request.

FIG. 5 illustrates a particular embodiment of a REST request 500 that may be used to transfer control information to a media server. The REST request 500 includes a server name or IP address 510, a service name (e.g., application program interface (API)) 512, a version number (e.g., v1) 514, and a method (e.g., "control_info") 516. The REST request 500 may be a uniform resource identifier (URI) that describes: (1) a mechanism used to access a resource, (2) a specific computing device at which the resource is located, and (3) a specific name of the resource. Thus, in the example shown in FIG. 5, the REST request may 500 identify a file "control_info" that can be accessed using HTTP, where the file is located at the computer system identified by the IP address 510 at the path API/V1/control_info.

When control information is being provided in the REST request 500, an HTTP POST method may be used to provide the control information and/or a file (e.g., an XML file or a JSON object) to the media server 150. When control information is to be retrieved (e.g., from the file "control_info"), an HTTP GET method may be used. An HTTP "PUT" method may be used to add control information into a file and an HTTP "DELETE" method may be used to delete a profile or specific control information from a file. Thus, the REST request may be considered as establishing a secondary connection between the personal electronic device 110 and the media server 150, as well as communicating control information via that secondary connection.

In an alternate embodiment, instead of identifying a file, a portion of the REST request 500 (e.g., "control_info") may include state information that is to be processed by the media server 150 (e.g., "autorecord=true").

It should be noted that the use of HTTP and REST to provide control information is for example only and not to be considered limiting. In alternate embodiments, other protocols, such as Simple Object Access Protocol (SOAP), Web Services Description Language (WSDL), etc. may be used to provide control information before or during streaming. Moreover, a plurality of streaming protocols may be used to provide a media stream from the personal electronic device 110 to the media server 150. Streaming protocols include, but are not limited to, real-time transport protocol (RTP), real-time messaging protocol (RTMP), and real-time streaming protocol (RTSP).

Figure 6:
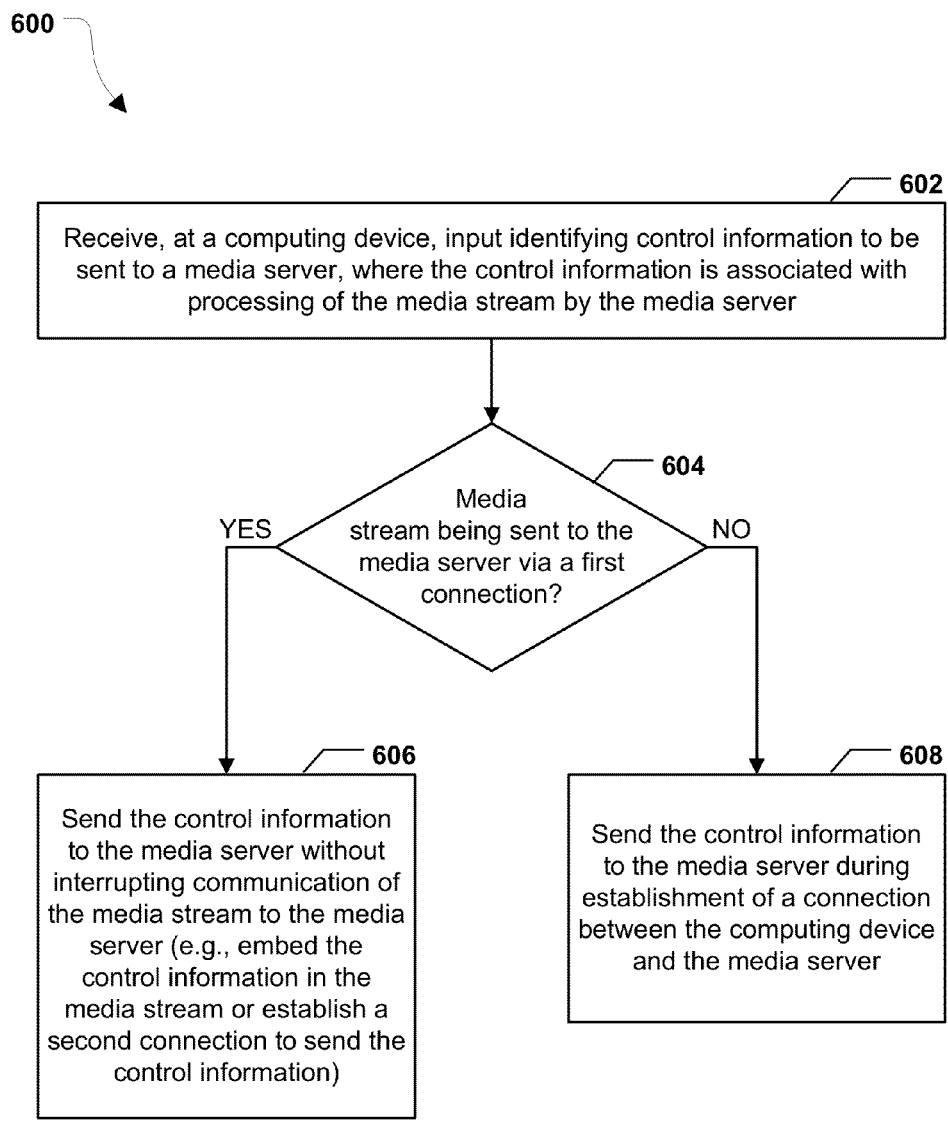
FIG. 6 is a flowchart that illustrates a particular embodiment of a method of providing control information to a media server.

FIG. 6 depicts a flowchart that illustrates a particular embodiment of a method that may be performed by the personal electronic device 110 of FIGS. 1-2. The method 600 includes receiving, at a computing device, input identifying control information to be sent to a media server, at 602. The control information is associated with processing of the media stream by the media server. In an illustrative embodiment, the input includes user input that is responsive to a GUI, such as any of the GUIs 300, 340, or 350.

The method 600 also includes determining whether the media stream is being sent to the media server via a first connection, at 604. In response to determining that the media stream is being sent via the first connection, the method 600 includes sending the control information to the media server without interrupting communication of the media stream to the media server, at 606. For example, the control information may be embedded in the media stream and sent via the first connection. As another example, a second connection to the media server may be established (e.g., via a REST request, such as the REST request 500 of FIG. 5) and the control information may be communicated via the second connection.

In response to determining that the media stream is not being sent via the first connection, the method 600 includes sending the control information to the media server during establishment of a connection between the computing device and the media server, at 608. For example, the control information may be included in a connection request, such as the HTTP request 400 of FIG. 4.

The method 600 of FIG. 6 may thus be used to send control information to a media server prior to sending a media stream to the media server, or while the media stream is being sent to the media server without interrupting the media stream.

It should be noted that the order of steps illustrated in the flowchart of FIG. 6 and described elsewhere herein are to be considered illustrative, and not limiting. In alternate embodiments, the order of steps may be different. Further, one or more steps may be optional and/or replaced by other steps. In addition, one or more steps may be consolidated.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the personal electronic device 110 of FIGS. 1-2, the media server 150 of FIG. 1, one or more of the computing devices 180 of FIG. 1, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)).

In a particular embodiment, a method includes receiving, at a computing device including a processor, input identifying control information to be sent to a media server. The method also includes determining whether the computing device is sending a media stream to the media server. The method further includes, in response to determining that the computing device is sending a media stream to the media server, sending the control information to the media server without interrupting the media stream by embedding the control information in the media stream.

In another particular embodiment, a computer-readable storage device stores instructions that, when executed by a processor, cause the processor to perform operations including receiving, at a computing device, input identifying control information to be sent to a media server. The control information is received while the computing device is sending a media stream to the media server via a first connection. The operations also include establishing a second connection between the computing device and the media server. The operations further include sending the control information to the media server via the second connection without interrupting communication of the media stream to the media server via the first connection.

In another particular embodiment, an apparatus includes a processor and a memory storing instructions executable by the processor to perform operations including receiving, at a computing device, input identifying control information to be sent to a media server. The control information is associated with processing of the media stream by the media server. The operations also include determining whether the computing device is sending the media stream to the media server via a first connection. The operations further include, in response to determining that the computing device is sending the media stream to the media server via the first connection, sending the control information to the media server by embedding the control information in the media stream or by establishing a second connection to send the control information to the media server. The operations include, in response to determining that the computing device is not sending the media stream to the media server via the first connection, sending the control information to the media server connection establishment between the computing device and the media server.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
    determining, at a mobile computing device, that the mobile computing device is sending a media stream to a media server;
    while the mobile computing device is sending the media stream to the media server:
        receiving at the mobile computing device an input identifying control information to be sent from the mobile computing device to the media server; and
        inserting the control information into a packet included in packets of the media stream and sending the packet to the media server without interrupting transmission of the media stream.

2. The method of claim 1, wherein the control information is associated with processing of the media stream at the media server.

3. The method of claim 1, further comprising receiving second input identifying second control information, and, in response to determining that the mobile computing device is not sending a second media stream to the media server, sending the second control information from the mobile computing device to the media server during establishment of a connection between the mobile computing device and the media server.

4. The method of claim 3, further comprising sending a connection request to the media server, wherein the connection request includes the second control information.

5. The method of claim 4, wherein the connection request includes a hypertext transfer protocol (HTTP) request.

6. The method of claim 1, wherein the control information instructs the media server to record the media stream using a digital video recorder (DVR).

7. The method of claim 1, wherein the control information identifies a transcoding parameter, a transrating parameter, or a combination thereof.

8. The method of claim 1, wherein the control information identifies a profile stored at the media server.

9. The method of claim 8, wherein the profile includes parameters associated with a plurality of adaptive bitrate (ABR) streaming renditions of the media stream to be generated by the media server.

10. The method of claim 8, wherein the control information embedded in the media stream includes at least one of:
    a first profile name when the media stream is a high-definition (HD) stream; or
    a second profile name when the media stream is a standard-definition (SD) stream.

11. The method of claim 1, further comprising executing a streaming application at the mobile computing device, wherein the streaming application is configured to encode the media stream, send the media stream to the media server, and send the control information to the media server.

12. The method of claim 11, wherein the media server comprises a cloud-based media server and wherein the streaming application is further configured to send a request to a network device to initiate the cloud-based media server.

13. A computer-readable storage device storing instructions that, when executed by a processor, cause the processor to perform operations comprising:
    sending, from a mobile computing device, a media stream to a media server via a first connection;
    while the mobile computing device is sending the media stream to the media server, receiving, at the mobile computing device, input identifying control information to be sent from the mobile computing device to the media server;

establishing a second connection between the mobile computing device and the media server; and while the mobile computing device is sending the media stream to the media server via the first connection, sending the control information from the mobile computing device to the media server via the second connection without interrupting communication of the media stream from the mobile computing device to the media server via the first connection.

14. The computer-readable storage device of claim 13, wherein establishing the second connection, sending the control information, or a combination thereof, comprises sending a representational state transfer (REST) request from the mobile computing device to the media server.

15. The computer-readable storage device of claim 14, wherein the REST request instructs the media server to access a file.

16. An apparatus comprising:
a processor; and
a memory storing instructions executable by the processor to perform operations comprising:
  determining whether a mobile computing device is sending a media stream to a media server via a first connection;
  while the mobile computing device is sending the media stream to the media server:
    receiving, at the mobile computing device, input identifying control information to be sent from the mobile computing device to the media server, wherein the control information is associated with processing of the media stream by the media server; and
  in response to determining that the mobile computing device is sending the media stream to the media server via the first connection, sending the control information to the media server without interrupting transmission of the media stream by:
    inserting the control information into a packet included in packets of the media stream and sending the packet to the media server via the first connection; or
    establishing a second connection to send the control information to the media server and sending the control information from the mobile computing device to the media server via the second connection.

17. The apparatus of claim 16, wherein the input identifying control information comprises user input.

18. The apparatus of claim 17, wherein the user input is responsive to one or more graphical user interfaces (GUIs).

19. The apparatus of claim 18, wherein the one or more GUIs are configured to present configuration options associated with a camera, a flash, a server connection configuration, recording of the media stream at the media server, or any combination thereof.

20. The apparatus of claim 18, wherein the one or more GUIs are configured to present configuration options associated with video settings, video size, automatically restarting communication of the media stream from the mobile computing device to the media server following loss of the first connection, video filters, adaptive bitrate (ABR) profiles, or any combination thereof.

* * * * *